United States Patent [19]
van der Lely

[11] Patent Number: 4,641,713
[45] Date of Patent: Feb. 10, 1987

[54] SOIL CULTIVATING MACHINES

[76] Inventor: Cornelis van der Lely, 7 Brüschenrain, Zug, Switzerland

[21] Appl. No.: 570,925

[22] Filed: Jan. 12, 1984

[30] Foreign Application Priority Data

Jan. 17, 1983 [NL] Netherlands ............... 8300154

[51] Int. Cl.⁴ ................ A01B 49/02; A01B 33/04
[52] U.S. Cl. .......................... 172/49; 172/52; 172/68
[58] Field of Search .............. 172/49, 50, 51, 52, 172/55, 65, 71, 48, 148, 574, 151, 149

[56] References Cited

U.S. PATENT DOCUMENTS

| | | | |
|---|---|---|---|
| 1,388,930 | 8/1921 | Burgess | 172/52 |
| 1,391,614 | 9/1921 | Christensen | 172/112 |
| 2,046,046 | 6/1936 | Washington | 172/21 |
| 2,617,341 | 11/1952 | Clayton | 172/52 X |
| 2,948,345 | 8/1960 | Brewster | 172/49 |
| 3,367,293 | 2/1968 | Cox | 172/71 |
| 4,279,310 | 7/1981 | Lely | 172/49 |

FOREIGN PATENT DOCUMENTS

| | | | |
|---|---|---|---|
| 197109 | 4/1958 | Austria | 172/49 |
| 2000671 | 6/1978 | United Kingdom | 172/604 |
| 519154 | 7/1976 | U.S.S.R. | 172/148 |

Primary Examiner—Richard J. Johnson
Attorney, Agent, or Firm—Penrose Lucas Albright

[57] ABSTRACT

A soil cultivating machine comprises a cultivating member having discs and a tined roller, both of which are power-driven. Holes are provided in the discs and the periphery of each disc is divided into plate tine members by recesses. Tines extending from the tined roller extend between adjacent discs. In operation, the discs cut the soil into strips, and these strips are then engaged by tines of the tined roller. Further equipment, such as a seed drill, cultivator, or roller or a combination of these may be hitched to the machine.

11 Claims, 11 Drawing Figures

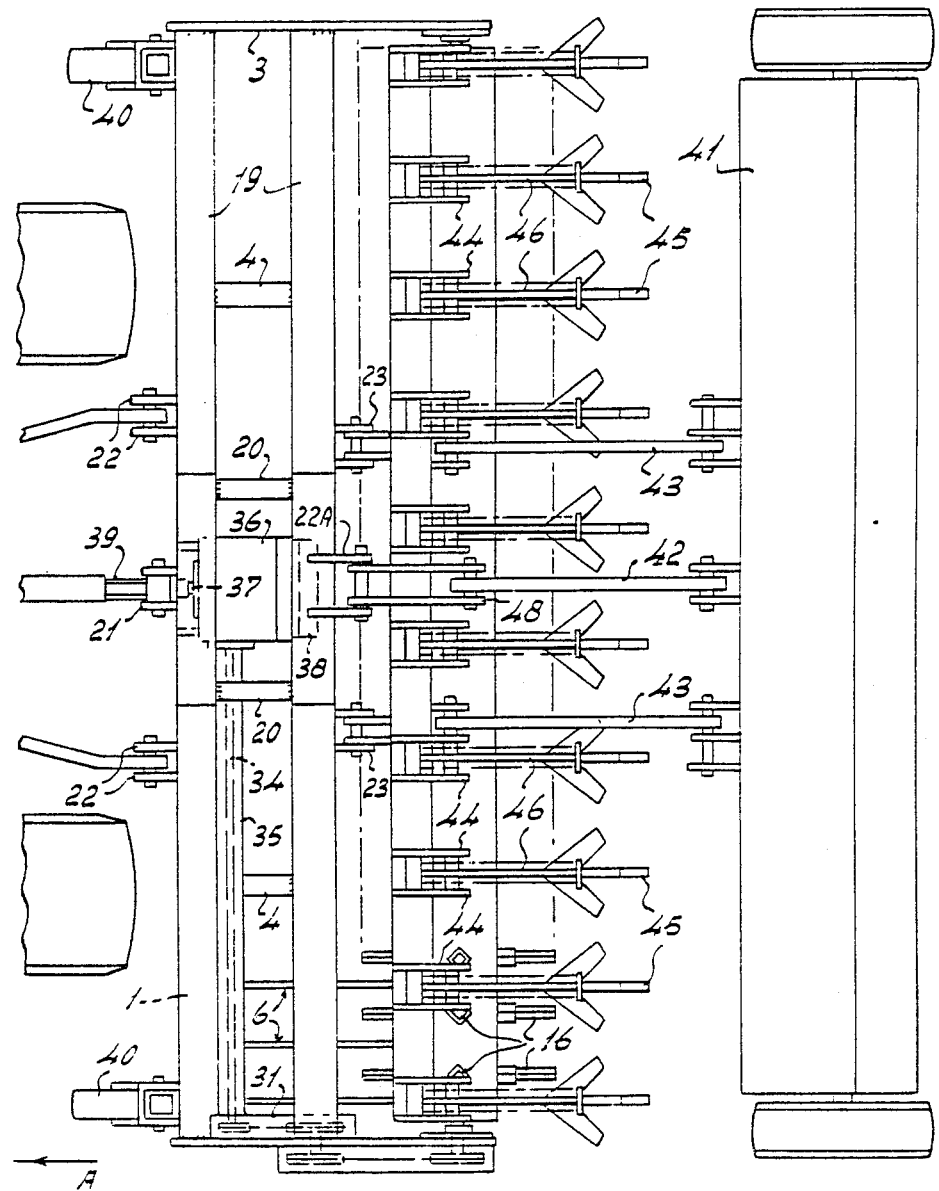

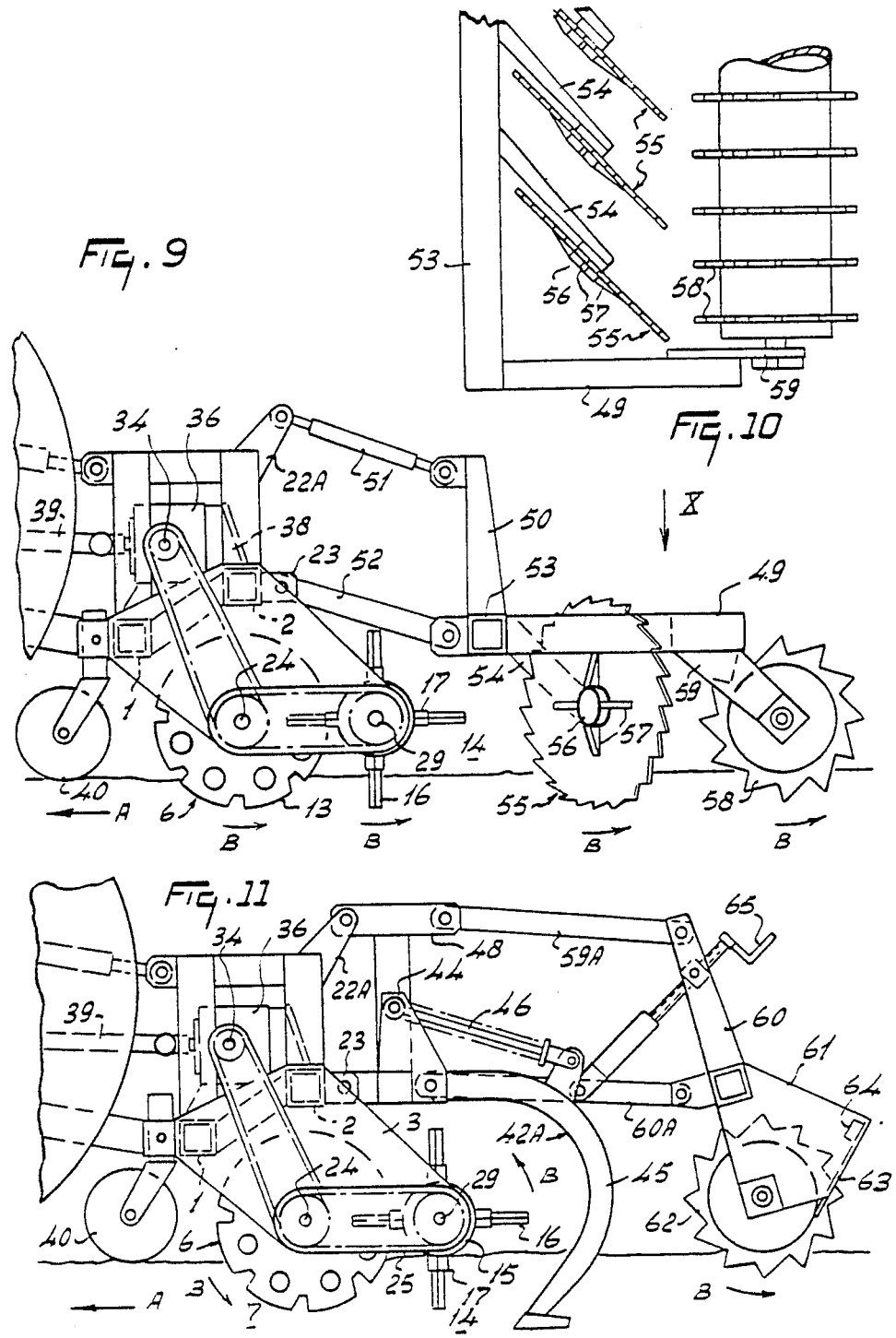

SOIL CULTIVATING MACHINES

BACKGROUND OF THE INVENTION

This invention relates to soil cultivating machines.

Machines are known which comprise a frame and at least one cultivating member supported in the frame to be driven about an axis extending transversely of the direction of travel of the machine. Soil cultivating machines of this type, particularly when working on heavy soil, are frequently not capable of performing in a single run a cultivation of the soil which provides a structure providing optimum conditions for germination of seeds or growth of seedlings.

SUMMARY OF THE INVENTION

According to the present invention there is provided a soil cultivating machine comprising a cultivating member, which is drivable about an axis extending transversely of the intended direction of operative travel of the machine, the cultivating member comprising a plurality of discs which co-operate with a tined roller of the machine.

In the context of the present invention, "tined roller" refers to a roller capable of packing the soil at least lightly having outwardly extending projections for working the soil. "Tined roller means" in the context of the claims is a "tined roller" capable of performing these functions.

In a preferred embodiment of the present invention, the tined roller is driven and comprises a tubular carrier which may bear on the ground during operation. In this way the machine will be stable in operation, which is particularly important when the machine is combined with a seed drill.

Preferably, holes are provided in the discs. By simple means it can thus be ensured that the discs more firmly attack the soil. The machine may be provided with cultivator tines arranged in a releasable manner. The machine can then be used on extremely hard soil, for example, in summer and after the harvest. The machine may be provided with a three-point suspension for attaching further implements to the machine so that adaptation to the prevailing conditions and the job concerned can be carried out at will.

An embodiment in accordance with the present invention provides a basic machine which—when combined with the appropriate implement—can be employed throughout the year to perform the appropriate and desired soil cultivation.

For a better understanding of the present invention and to show how it may be carried into effect, reference will now be made, by way of example, to the accompanying drawings, in which:

BRIEF DESCRIPTION OF THE DRAWINGS

FIG. 5 shows the machine of FIGS. 1 to 4 in combination with a seed drill;

FIG. 8 is a plan view of the combination shown in FIG. 7;

FIG. 9 shows the machine of FIGS. 1 to 4 in combination with another soil cultivating device;

FIG. 10 shows part of the combination of FIG. 9; and

FIG. 11 shows the combination of FIG. 6 with a packer roller.

DESCRIPTION OF THE PREFERRED EMBODIMENTS

Figure 1:
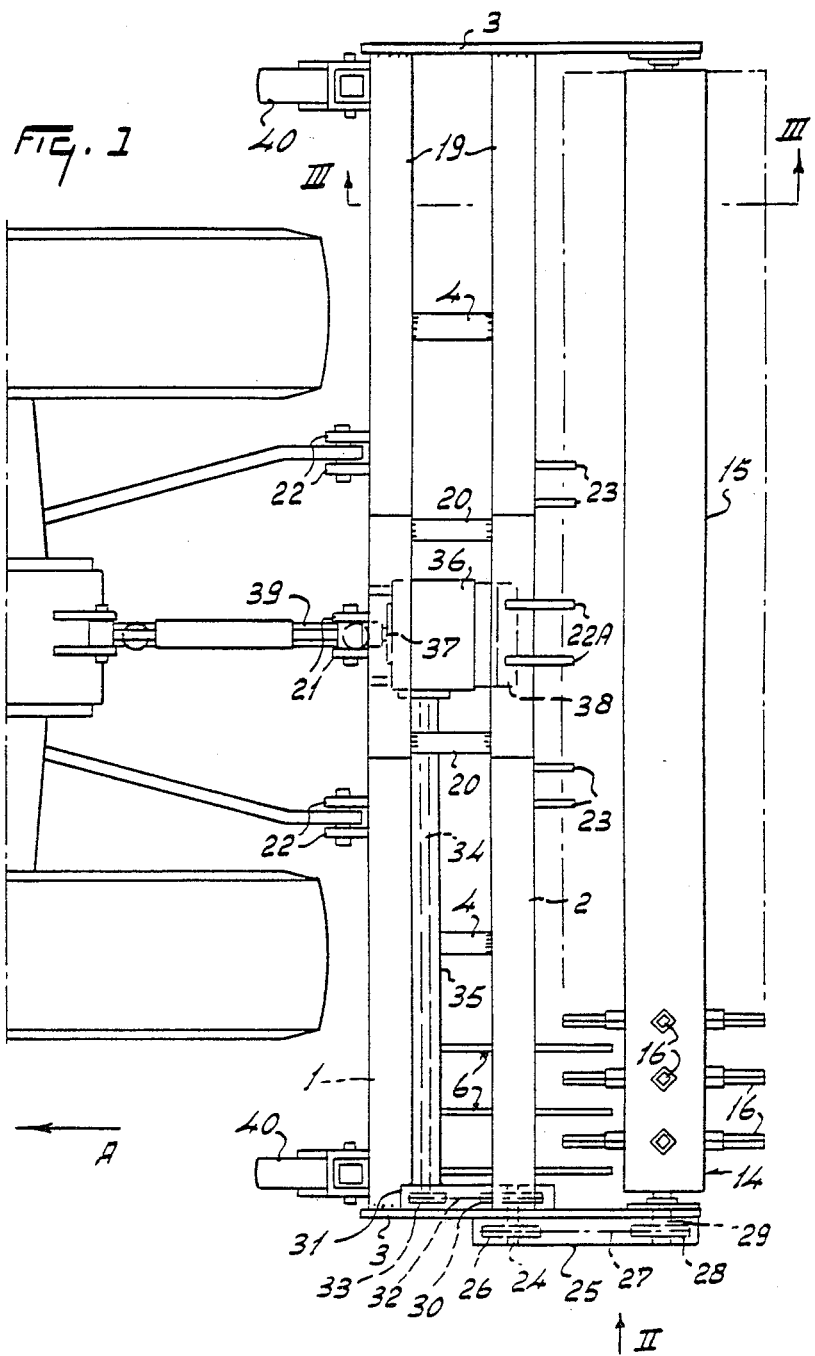
FIG. 1 is a plan view of the soil cultivating machine.
Figure 2:
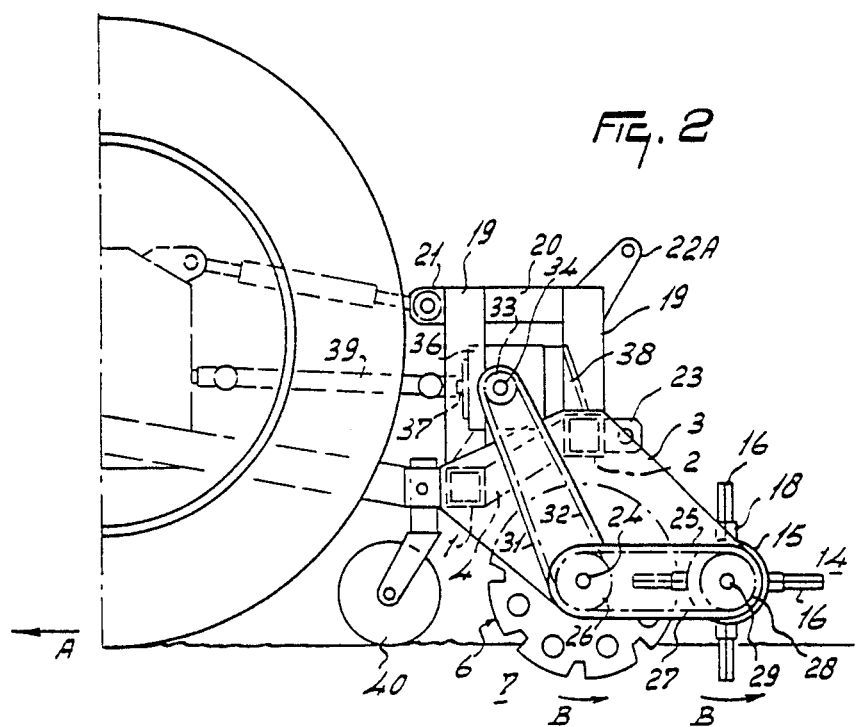
FIG. 2 is a side view taken in the direction of the arrow II in FIG. 1.
Figure 3:
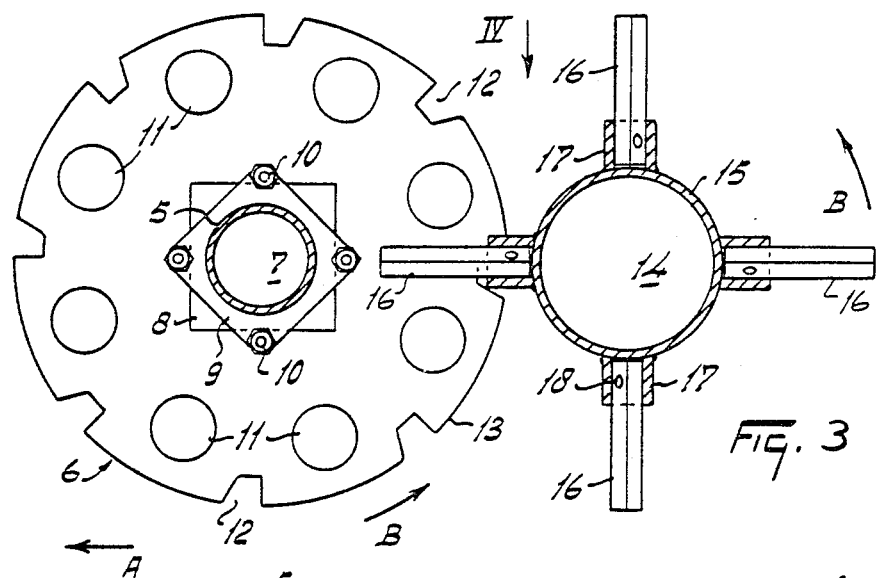
FIG. 3 is an enlarged view taken on the line III—III in FIG. 1.
Figure 4:
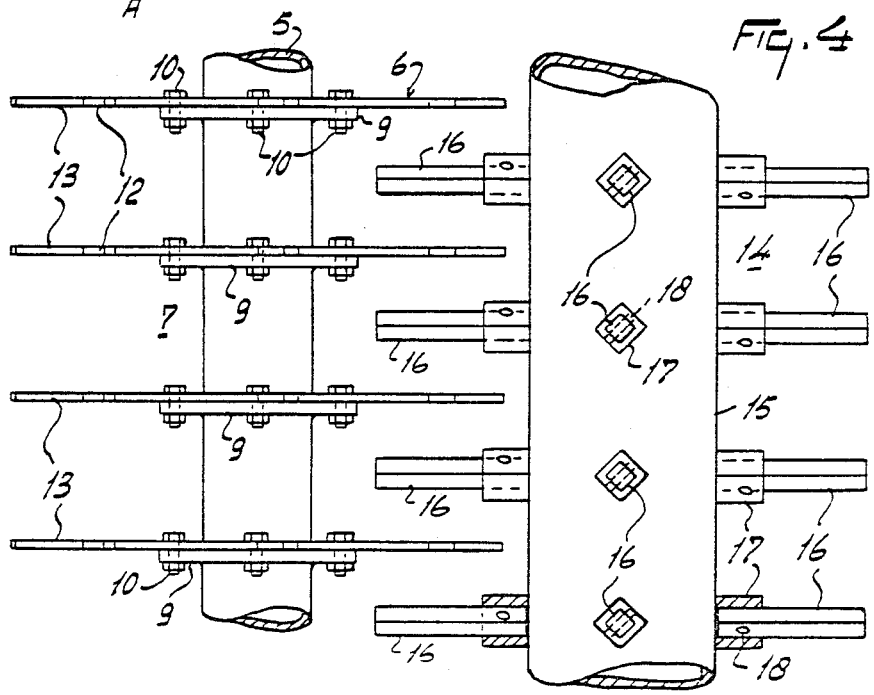
FIG. 4 is a view taken in the direction of the arrow IV in FIG. 3.

The machine shown in FIGS. 1 to 4 comprises two parallel frame beams 1 and 2 disposed one behind the other with respect to the intended direction of operative travel of the machine, as indicated by the arrow A. The frame beams 1 and 2 are substantially horizontal and extend transversely of the direction A. From FIG. 2 it will be appreciated that the frame beam 2 is at a higher level than the frame beam 1. The ends of the frame beams 1 and 2 are interconnected by upwardly extending plates 3 extending in the direction A (FIG. 2). The frame beams 1 and 2 are also interconnected between their ends by supports 4. The front and rear edges of the plates 3 are substantially parallel to each other and slope downwardly from front to rear. The underside of each plate 3 is substantially horizontal. Near the transition between the front edge and the underside of each plate 3 a tubular carrier 5 is rotatably mounted between the plates 3 by means of stub shafts and bearings. The tubular carrier 5 is provided with discs 6, which are substantially normal to the rotary axis of the carrier. The tubular carrier 5 and the discs 6 constitute a rotatable cultivating member 7. The discs 6 are arranged at equal distances from one another. The distance between adjacent discs 6 is preferably fifteen centimeters and the diameter of each disc is preferably fifty centimeters. Each of the discs 6 has a central, rectangular (and preferably square) opening 8 through which can pass plates 9 (which are also rectangular and preferably square) which are mounted on the tubular carrier 5, so that each of the discs 6 can be fastened to a plate 9 by means of bolts 10 at the corners of the plates and passing through holes near the middle of the sides of the square opening 8 (FIG. 3). Near its periphery, each disc 6 has holes 11. In the illustrated embodiment, these holes 11, are circular and their centers are angularly spaced from one another by 45° on an imaginary circle centered on the rotary axis of the cultivating member 7. The distance between this circle and the periphery of the disc 6 is about one quarter of the radius of the disc 6. Each disc 6 also has at its periphery trapezoidal recesses 12 located centrally between each two adjacent holes 11. The recesses 12 have one substantially radial edge, the opposite edge being inclined to the radial line by about 20° in a manner such that the recess is outwardly flared. The inclined edge of each recess 12 is located to the rear with respect to the intended direction of operative rotation of the discs 6, as indicated by an arrow B, and extends in a trailing position. As shown in FIG. 3, the recesses 12 extend inwardly to an imaginary circle which is tangential to, and circumscribes, the holes 11. The portions of the periphery of each disc between the recesses 12 can be regarded as plate tine members or simply as tines 13. Between the plates 3 near their rear edges there is a roller 14, the ends of which are rotatably supported in bearing housings by means of stub shafts and bearings. The roller 14 comprises a tubular carrier 15 provided with spaced circumferential rows of projections referred to herein as tines 16. The rows are arranged so that the tines 16 of each row move centrally between two adjacent discs 6 of the cultivating member 7. The tines 16 are straight, as shown in FIG. 3, and extend radially throughout their length to project between the discs 6. Each row comprises four tines 16 spaced apart from each other by circumferential angles of about 90°, and their ends describe a circle having a diameter of preferably about fifty centimeters. Each tine is secured by a pin 18 in a sleeve-like holder 17 welded to the periphery of the tubular carrier 15. Each tine 16 has an angular, preferably square, cross-section and is disposed so that a diagonal of the cross-section lies in a plane normal to the longitudinal centerline of the tubular carrier 15, this centerline being the axis of rotation of the roller 14.

Above each frame beam 1 and 2 there is a bracket-shaped beam 19. The beams 19 are arranged near the ends of the beams 1 and 2 and are provided in the middle with a horizontal part. The horizontal parts are interconnected by supports 20 extending in the direction A. The horizontal central part of the front beam 19 is provided at the front near the middle with a pair of lugs 21 for attaching the top arm of a three-point lifting device of a tractor. At equal distances on each side of the center the front of the frame beam 1 is provided with pairs of lugs 22 for attaching the lower arms of the three-point lifting device. The central part of the rear beam 19 is provided near the middle with a pair of lugs 22A, and at equal distances on each side of the center, at the rear, the frame beam 2 is provided with pairs of lugs 23. The pairs of lugs 22A and 23 constitute coupling points for a three-point suspension of a device to be combined with the machine. The combinations will be described in further detail hereinafter.

On the left-hand side, as viewed in the direction A, the stub shaft 24 of the tubular carrier 5 of the cultivating member 7 is prolonged and extends into a protective casing 25 on the outboard side of the plate 3. Inside the casing 25 the stub shaft 24 is provided with a sprocket 26 over which a chain 27 runs. The chain 27 also runs over a sprocket 28 on an extended stub shaft 29 of the tubular carrier 15 of the roller 14. The extended stub shaft 24 is also provided with a sprocket 30 accommodated in a protective casing 31 on the inboard side of the plate 3. A chain 32 runs over the sprocket 30 and over another sprocket 33 on a shaft 34, The shaft 34 is journalled near the top of the casing 31 and in a tube 35 extending transversely of the direction A and parallel to the frame beams 1 and 2. The end of the tube 35 away from the sprocket 33 is fastened to a gear box 36, into which the shaft extends. Tne gear box 36 is supported by the frame beams I and 2 and comprises a shaft 37 which extends in the direction A and is drivably connected through a change-speed gear 38 at the rear side of the gear box with the shaft 34. The shaft 37 projects from the front of the gear box 36 and can be connected by means of an auxiliary shaft 39 with the power take-off shaft of a tractor.

The above-described machine comprising the combination of a cultivating member 7 rotatable about a substantially horizontal, transverse axis with a roller 14 provided with tines 16 operates as follows.

Using the coupling means 20 and 21 on the front of the beams 1 and 19, the machine is connected to the three-point lifting device of the tractor. For operation, the assembly is moved in the direction A. By means of the auxiliary shaft 39, the power take-off shaft of the tractor can rotate the front cultivating member 7 through the transmission described above in the direction indicated by the arrow B in FIGS. 2 and 3. During rotation, the discs 6 divide the soil into strips, which are subsequently worked by the tines 16 of the roller 14, the effective diameter of which, as stated above, corresponds to the diameter of the cultivating member 7. During this operation the soil is attacked by the tines 16 between each two adjacent discs and the soil enclosed between the discs is then displaced to the rear. Owing to the specific design of the discs formed by the combination of the holes 11 at the periphery, the recesses 12 and the tines 13 the machine is particularly suitable for carrying out a primary work either in spring or in autumn. Particularly on very dirty soil and/or on stubble fields the discs, by their specific constructions, are capable of co-operating effectively with the tines 16 to work weeds and vegetable material by mixing it intimately with the soil. With the aid of vertically adjustable ground wheels 40 arranged on the front of the frame beam 1, the working depth of the cultivating member 7 and the roller 14 can be set. When the ground wheels 40 are moved into the position shown by way of example in FIG. 5 the tubular carrier 15 of the roller 14 can bear on the ground. This not only enhances the stability of the machine in operation, but also creates a soil structure particularly suitable for sowing, since the tubular carrier 15 then has a packing effect. In this working position the machine can co-operate very effectively with a seed drill 41, which, as indicated in FIG. 5, can be coupled by means of arms 42 and 43 with the coupling means 22 and 23.

Figure 6:
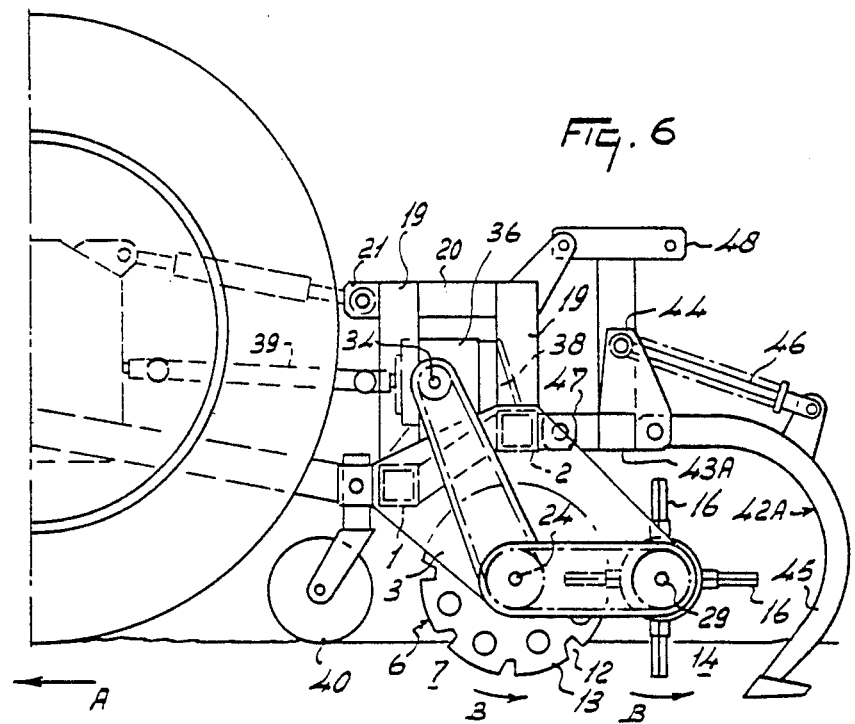
FIG. 6 shows the machine of FIGS. 1 to 4 in combination with a cultivator.
Figure 7:
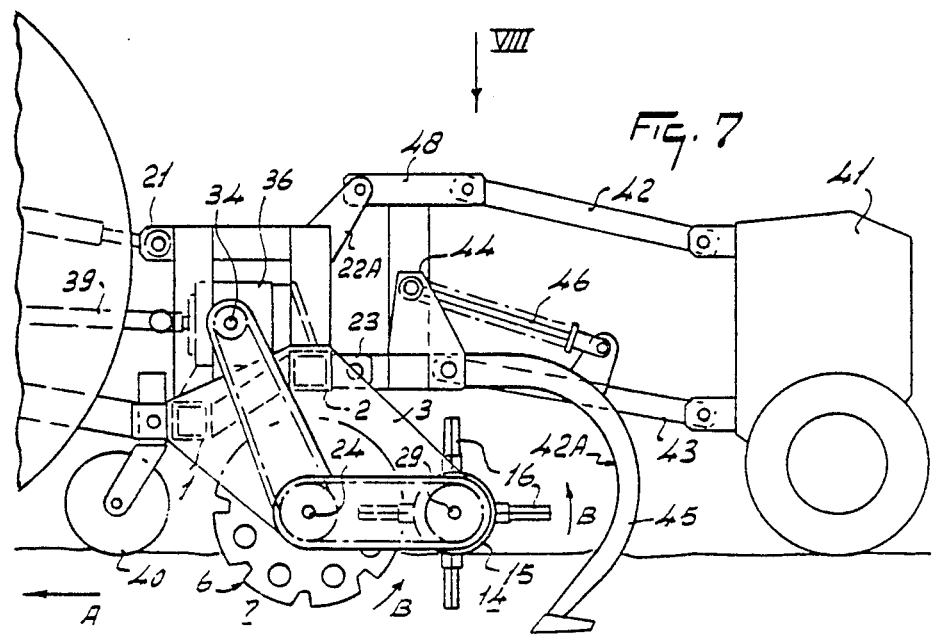
FIG. 7 shows a combination similar to that of FIG. 6 but also comprising a seed drill.

The machine described with reference to FIGS. 1 to 4 can be combined, if desired by means of the coupling points formed by the pairs of lugs 22 and 23 with a cultivator 42A of the kind shown in FIG. 6. The cultivator 42A comprises a frame beam 43A extending transversely of the direction A on which a row of cultivator tine means consisting of tines 45 is pivotally mounted by means of equidistant pairs of lugs 44. Each of the cultivator tines 45 can deflect against the force of a spring mechanism 46 if overload is imminent. The frame beam 43A is provided at equal distances from the center with pairs of lugs 47 and at the middle with a support 48 which together constitute a three-point fastening means, which can be connected with the coupling points formed by the lugs 22A, 23 on the rear of the frame beams 2 and 19. From FIG. 6 it will be appreciated that, with this coupling arrangement, the free ends of the cultivator tines 45 can extend below the roller 14. The combination with the cultivator 42A is very suitable for working fields having relatively hard soil, as may be the case in summer and in particular towards the end of the summer. The combination with the cultivator 42A shown in FIG. 6 is particularly suitable for working stubble fields. When the assembly is set at a depth at which the tubular carrier 15 of the roller 14 bears on the ground during operation, it is possible—since the cultivator tines 45 extend substantially below the roller—to obtain in addition some packing effect and stabilization with the aid of the tubular carrier 15 so that the assembly can be combined with a seed drill 41 that can be attached this time to coupling means on the rear side of the beam 43A and the support 48 as shown in FIGS. 7 and 8.

The machine described with reference to FIGS. 1 to 4 may also be combined with a device comprising a frame 49, which can be connected with the coupling points 22A, 23 on the rear of the frame beam 19 and 2 with the aid of a trestle 50 and arms 51, 52, the top arm 51 having an adjustable length (see FIG. 9). The frame 49 comprises a transverse beam 53 provided with a row of displacer disc means consisting of freely rotatable discs 55 arranged side by side and supported by arms 54. The row extends transversely of the direction A and the rotary axes of the discs 55 are substantially parallel to each other. A plane normal to the rotary axes of the discs 55 is at an angle of about 60° to the direction A. The discs 55 are each provided with a hub 56 provided with radially extending, tapering ridges 57 extending over substantially half the radius of the discs. The periphery of each disc 55 has outwardly extending ground engaging members comprising sawtooth-like serrations so that the discs are rotated during operation by their ground contact and thus produce lateral displacement of the soil.

Behind the row of discs 55 there is a packer roller 58, which is supported for free rotation by downwardly and rearwardly inclined supports 59 mounted on the frame. The combination shown in FIGS. 9 and 10 can be used effectively for working the soil, for example, in summer or at the end of the summer; the members formed by the discs 55 which are capable of laterally displacing the soil can have a very effective result inter alia on slopes.

A combination based on the machine described with reference to FIGS. 1 to 4 and suitable for use on heavy, very hard soil at the end of the summer, is shown in FIG. 11. This combination comprises the cultivator shown in FIG. 6 behind which is mounted, by means of a three-point suspension comprising arms 59A and 60A, a frame 61 provided with a trestle 60, in which frame a packer roller 62 is freely rotatable. The packer roller 62 has scrapers 63 at the rear which extend between tines disposed in circumferential rows on the packer roller, these scrapers 63 being in contact with the tubular carrier of the packer roller at a position below a horizontal plane containing its rotary axis. The scrapers 63 are arranged on a transverse carrier 64 located near the rear of the frame 61. A screw spindle 65 mounted between a lower arm 60A and the trestle 60 on the frame 61 enables the position of the packer roller to be adjusted with respect to the other implements of the combination.

The machine described above with reference to FIGS. 1 to 4, comprising the cultivating members 7 provided with discs 6 of specific design and the tined roller 14 co-operating with it, may, as will be appreciated from the above examples, serve as a basic unit for combination with other devices in a manner such that, in each season, the soil can be worked effectively, whilst moreover a combination including a seed drill enables seeds to be rationally distributed in a single run both in spring and in autumn. The machine described is thus suitable for use at any time for performing a desired soil cultivation matching the prevailing conditions.

Although various features of the machine that described and illustrated in the drawings will be set forth in the following claims as inventive features, the invention is not necessarily limited to these features and may encompass all inventive features that have been disclosed both individually and in various combinations.

Having disclosed my invention, what I claim as new and desire to be secured by Letters Patent of the United States is:

1. A cultivating machine for seedbed preparation of dirty soil in the sense of including vegetable matter such as weeds and stubble which comprises forward soil cutting discs and following roller means with projections extending outwardly therefrom, said forward disc and said roller means having parallel horizontal axes of rotation extending normal to their ussual direction of travel, power means interconnected to said roller means and said forward discs for rotating such components about their respective axes through the soil, said forward discs comprising coplanar discs in front of said roller means for slicing the soil into parallel strips, said roller means comprising a roller with said projections extending therefrom between said forward discs for mixing said vegetable matter intimately with the soil in each said strip up to the depth said projections extend from said roller, said roller packing said soil to create soil structure suitable for sowing, and soil displacing means comprising a plurality of further discs having axes of rotation extending obliquely with respect to said usual direction of travel for laterally displacing the soil.

2. A soil cultivating machine as claimed in claim 1 comprising a packer roller disposed at the machine's rear.

3. A soil cultivating machine as claimed in claim 2, in which said packer roller is provided at its rear with scrapers which engage said packer roller at a position below said packer roller's rotary axis.

4. A soil cultivating machine as claimed in claim 1, in which the diameter of each path described by the ends of said projections is substantially equal to the diameter of said first mentioned discs.

5. A soil cultivating machine as claimed in claim 1, wherein said projections are arranged in circumferential rows, said projections in each such row being spaced apart from one another by circumferential angles of 90° and extending substantially radially.

6. A soil cultivating machine as claimed in claim 5, in which blade members extend from the periphery of said forward discs.

7. A soil cultivating machine as claimed in claim 6, in which at least some of said forward discs have holes.

8. A soil cultivating machine as claimed in claim 7 in which in each said forward disc an imaginary circle tangential to and circumscribing said holes is at a distance from the periphery of such forward disc which is substantially equal to the distance of each of said blade members extend therefrom.

9. A soil cultivating machine as claimed in claim 8, in which said blade members of said forward discs are defined between recesses provided in said peripheries of said discs.

10. A soil cultivating machine as claimed in claim 1 in which said further discs are provided with projections at their peripheries which cause said further discs to rotate during operating by ground contact.

11. A soil cultivating machine as claimed in claim 1, wherein said further discs are provided at their respective peripheries with spaced outwardly extending ground engaging members for rotating said further discs.

* * * * *